US009989092B2

(12) United States Patent
Kurimura et al.

(10) Patent No.: US 9,989,092 B2
(45) Date of Patent: Jun. 5, 2018

(54) SINTERED BEARING AND METHOD OF MANUFACTURING SAME

(71) Applicant: NTN CORPORATION, Osaka (JP)

(72) Inventors: Tetsuya Kurimura, Mie (JP); Fuyuki Ito, Mie (JP); Shinji Komatsubara, Mie (JP); Tadahiro Uchiyama, Aichi (JP)

(73) Assignee: NTN CORPORATION, Osaka (JP)

( * ) Notice: Subject to any disclaimer, the term of this patent is extended or adjusted under 35 U.S.C. 154(b) by 229 days.

(21) Appl. No.: 14/899,896

(22) PCT Filed: Jun. 25, 2014

(86) PCT No.: PCT/JP2014/066877
§ 371 (c)(1),
(2) Date: Dec. 18, 2015

(87) PCT Pub. No.: WO2015/012055
PCT Pub. Date: Jan. 29, 2015

(65) Prior Publication Data
US 2016/0138651 A1    May 19, 2016

(30) Foreign Application Priority Data
Jul. 22, 2013   (JP) .................................. 2013-151697

(51) Int. Cl.
*F16C 33/14* (2006.01)
*B22F 3/16* (2006.01)
(Continued)

(52) U.S. Cl.
CPC .......... *F16C 33/145* (2013.01); *B22F 1/0003* (2013.01); *B22F 1/0014* (2013.01);
(Continued)

(58) Field of Classification Search
CPC .. B22F 1/0003; B22F 1/0014; B22F 2301/10; B22F 2301/30; B22F 2301/35;
(Continued)

(56) References Cited

U.S. PATENT DOCUMENTS 5,469,008 A * 11/1995 Nakajima ........... F16C 33/1035
310/67 R
6,091,051 A * 7/2000 Morigami .......... G03G 15/2053
219/216
(Continued)

FOREIGN PATENT DOCUMENTS

CN   103119313   5/2013
JP   11-269508   10/1999
(Continued)

OTHER PUBLICATIONS

Supplementary European Search Report dated Mar. 9, 2017 in European patent application No. EP 14 82 9542.
(Continued)

*Primary Examiner* — Alex W Mok
(74) *Attorney, Agent, or Firm* — Wenderoth, Lind & Ponack, L.L.P.

(57) ABSTRACT

A sintered bearing includes a sintered metal formed by using a metal powder mixture containing copper powder and iron powder. The metal powder mixture contains 80 wt % or more of particles having an average particle diameter of less than 45 μm. The copper powder contains electrolytic copper powder. The electrolytic copper powder contains 40 number % or more of particles having a circularity of 0.64 or more.

18 Claims, 3 Drawing Sheets

(51) Int. Cl.
  *H02K 7/08* (2006.01)
  *C22C 9/00* (2006.01)
  *F16C 32/06* (2006.01)
  *F16C 33/10* (2006.01)
  *B22F 1/00* (2006.01)
  *B22F 5/00* (2006.01)
  *C22C 1/04* (2006.01)
  *F16C 33/12* (2006.01)
  *C22C 9/02* (2006.01)
  *F16C 17/08* (2006.01)
  *F16C 17/10* (2006.01)

(52) U.S. Cl.
  CPC ............... *B22F 3/16* (2013.01); *B22F 5/00* (2013.01); *C22C 1/0425* (2013.01); *C22C 9/00* (2013.01); *C22C 9/02* (2013.01); *F16C 32/0633* (2013.01); *F16C 33/104* (2013.01); *F16C 33/128* (2013.01); *H02K 7/08* (2013.01); *B22F 2301/10* (2013.01); *B22F 2301/30* (2013.01); *B22F 2301/35* (2013.01); *F16C 17/08* (2013.01); *F16C 17/102* (2013.01); *F16C 2204/10* (2013.01); *F16C 2370/12* (2013.01)

(58) Field of Classification Search
  CPC . B22F 3/16; B22F 5/00; C22C 1/0425; C22C 9/00; C22C 9/02; F16C 17/08; F16C 17/102; F16C 2204/10; F16C 2370/12; F16C 32/0633; F16C 33/104; F16C 33/128; F16C 33/145; F16C 17/10; H02K 7/08
  USPC ............... 310/90; 384/114; 419/38; 420/473
  See application file for complete search history.

(56) References Cited

U.S. PATENT DOCUMENTS

| | | | | |
|---|---|---|---|---|
| 2003/0132678 A1* | 7/2003 | Park | ............... | F16C 33/103 310/90 |
| 2007/0144833 A1* | 6/2007 | Nii | ............... | F16C 17/04 184/7.1 |
| 2007/0231182 A1* | 10/2007 | Veloff | ............... | B22F 9/04 419/22 |
| 2008/0247689 A1* | 10/2008 | Nomura | ............... | F16C 19/06 384/129 |
| 2009/0142010 A1 | 6/2009 | Ito et al. | | |
| 2010/0310199 A1 | 12/2010 | Okamura et al. | | |
| 2011/0021916 A1* | 1/2011 | Morita | ............... | A61B 8/00 600/443 |
| 2011/0226138 A1* | 9/2011 | Sahu | ............... | C22C 9/06 99/485 |
| 2012/0161565 A1* | 6/2012 | Bilcai | ............... | C09J 5/06 310/154.07 |
| 2012/0299408 A1* | 11/2012 | Higuchi | ............... | H02K 1/2793 310/63 |
| 2013/0078137 A1* | 3/2013 | Gaag | ............... | C22C 9/04 420/471 |
| 2013/0101244 A1* | 4/2013 | Nishizawa | ............... | C22C 9/00 384/279 |
| 2013/0182979 A1 | 7/2013 | Ito et al. | | |
| 2014/0234152 A1* | 8/2014 | Ito | ............... | B22F 1/0003 419/11 |

FOREIGN PATENT DOCUMENTS

| | | | | |
|---|---|---|---|---|
| JP | 2006-214003 | | 8/2006 | |
| JP | 2009-197903 | | 9/2009 | |
| JP | 2012067893 A | * | 4/2012 | ............ F16C 33/104 |
| JP | 2012-241728 | | 12/2012 | |
| JP | 2013-92163 | | 5/2013 | |
| WO | WO 2012043140 A1 | * | 4/2012 | ............ F16C 33/104 |
| WO | WO 2013042664 A1 | * | 3/2013 | ............ C22C 38/00 |

OTHER PUBLICATIONS

Anonymous: "GGP Metalpowder AG Products Electrolytic Copper Powders dendritic", XP055349120, Retrieved from the Internet: URL:http://web.archive.org/web/20130624001315/http://www.ggp-metal.com/en/products-electrolytic-copper-powders-dendric.php [retrieved on Feb. 23, 2017], Jun. 24, 2013.

Anonymous: Irregular Copper Powders Makin Metal Powders (UK), XP055349124, Retrieved from the Internet: URL:http://web.archive.org/web/20120827231134/http://www.makin-metals.com/copper-powder/irreglar-copper-powders/[retrived on Feb. 23, 2017], Aug. 27, 2012.

P.A. Webb, "Volume and Density Determinations for Particle Technologists", Internet Citation, pp. 1-15, XP002495931, Retrieved from the Internet: URL:http://www.micromeritics.com/pdf/app_articles/density_determinations.pdf [retrieved on Sep. 15, 2008], Feb. 2001.

Bin Xiao et al., "Shape circularity measure method based on radial moments", Journal of Electronic Imaging, vol. 22, No. 3, p. 33022, XP060026270, ISSN: 1017-9909, Jul. 1, 2013.

International Preliminary Report on Patentability dated Jan. 26, 2016 in International (PCT) Application No. PCT/JP2014/066877.

International Search Report dated Sep. 16, 2014 in International (PCT) Application No. PCT/JP2014/066877.

Office Action dated Apr. 19, 2017 in corresponding Chinese Application No. 201480041234.9 (with English translation of search report).

* cited by examiner

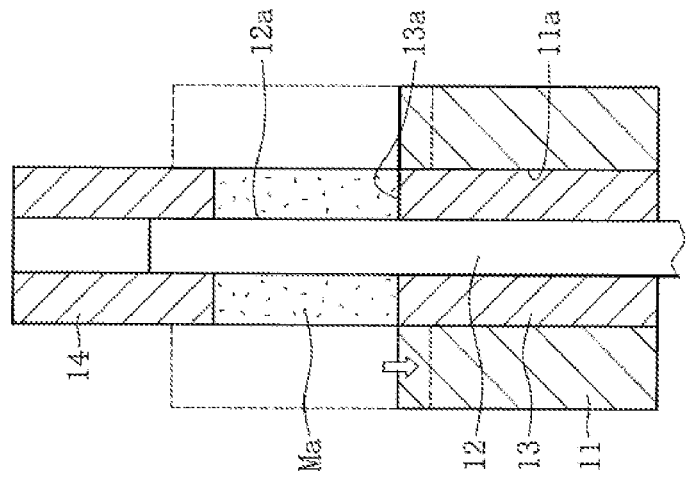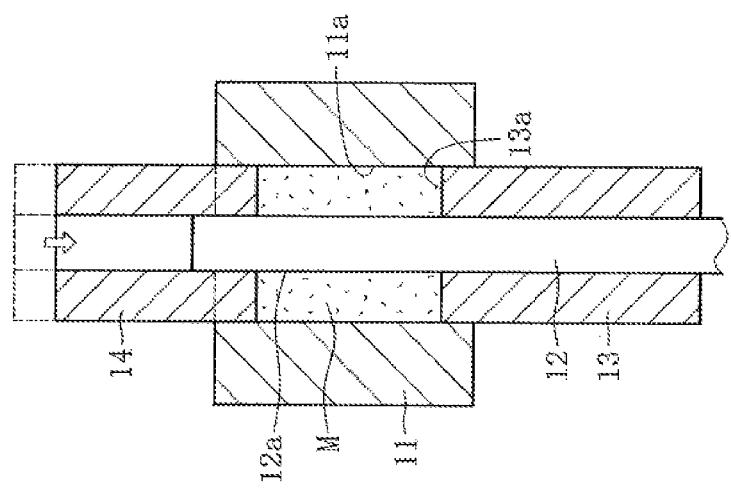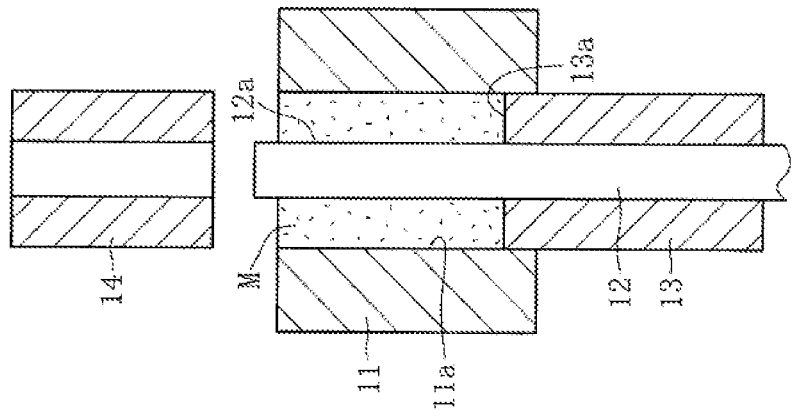

SINTERED BEARING AND METHOD OF MANUFACTURING SAME

TECHNICAL FIELD

The present invention relates to a sintered bearing, and more particularly, to a sintered bearing formed by using a metal powder mixture containing copper powder and iron powder and a manufacturing method for the sintered bearing.

BACKGROUND ART

A sintered bearing is used under a state in which inner pores are impregnated with a lubricating oil, and along with rotation of the sintered bearing relative to a shaft to be supported, the lubricating oil impregnating an inner portion exudes to a sliding part between the sintered bearing and the shaft, to thereby form an oil film through which the shaft is rotatably supported. Such a sintered bearing has been used as a bearing configured to rotatably support a small motor such as an HDD, an LBP polygon scanner motor, or a fan motor due to the high rotation accuracy and quietness thereof.

As the electronic device described above becomes thinner, the axial dimension of the sintered bearing is decreasing more and more. In the sintered bearing having such a small axial dimension, bearing stiffness (in particular, bearing stiffness in a radial direction) is required to be ensured. In particular, in the case where the sintered bearing is incorporated into a mobile telephone, a tablet terminal, or the like, high bearing stiffness is also required in the sintered bearing because those devices are used in various postures. However, the sintered bearing has an infinite number of pores opened in a bearing surface, and hence there is risk in that the oil film in the sliding part is released from openings of the bearing surface to an inside of the sintered bearing, that is, so-called dynamic pressure absence occurs, with the result that desired bearing stiffness may not be obtained. Such a situation can be avoided by subjecting the bearing surface to pore-sealing treatment by shot blasting, rotation sizing, or the like after forming the sintered bearing. However, in this case, manufacturing cost increases owing to an increase in man-hour.

In view of the above, for example, in Patent Literature 1, metal powder serving as a material for a sintered bearing is refined (the maximum particle diameter of tin powder is set to 25 μm or less, and the maximum particle diameters of copper powder and SUS powder are set to 50 μm or less), to thereby form fine surface openings in a bearing surface owing to the melting of the tin powder. Thus, the dynamic pressure absence is prevented.

CITATION LIST

Patent Literature 1: JP 2009-197903 A

SUMMARY OF INVENTION

Technical Problem

However, it cannot be said that the dynamic pressure absence is suppressed sufficiently merely through use of fine powder as in Patent Literature 1.

It is an object of the present invention to increase bearing stiffness by sufficiently suppressing dynamic pressure absence from a bearing surface of a sintered bearing.

Solution to Problem

In order to attain the above-mentioned object, according to one embodiment of the present invention, there is provided a sintered bearing, comprising a sintered metal formed by using a metal powder mixture containing copper powder and iron powder, the metal powder mixture containing 80 wt % or more of particles having an average particle diameter of less than 45 μm, the copper powder containing electrolytic copper powder containing 40 number % or more of particles having a circularity of 0.64 or more.

Further, in order to attain the above-mentioned object, according to one embodiment of the present invention, there is provided a method of manufacturing a sintered bearing, comprising: subjecting a metal powder mixture containing copper powder and iron powder to compression molding to form a compact; and sintering the compact at a predetermined sintering temperature, the metal powder mixture containing 80 wt % or more of particles having an average particle diameter of less than 45 μm, the copper powder containing electrolytic copper powder containing 40 number % or more of particles having a circularity of 0.64 or more.

Note that, the term "circularity" refers to a ratio between a circle area-equivalent diameter and a circumference-equivalent diameter of a two-dimensional projection image of each particle (JIS H7008:2002). Further, the term "average particle diameter" of particles refers to an average value of circle area-equivalent diameters of two-dimensional projection areas of respective particles. In practice, projected areas of particles in a statistically effective ratio among target particles are measured, and an average value of the circle area-equivalent diameters calculated from the measured values is determined, to thereby determine an average particle diameter.

As described above, when fine powder containing 80 wt % or more of particles having an average particle diameter of less than 45 μm is used as the metal powder mixture serving as a material for the sintered metal, the density of the sintered bearing is increased to reduce inner pores, with the result that surface openings of the bearing surface can be reduced. Further, as the kinds of the copper powder, there may be given electrolytic copper powder and atomized powder. The electrolytic copper powder has a dendritic complicated shape, and hence the contraction is likely to proceed due to sintering. Thus, when the copper powder in the metal powder mixture contains the electrolytic copper powder, the sintering of the copper powder is accelerated to further increase the density of the sintered bearing, with the result that the surface openings of the bearing surface can be further reduced. As described above, when the metal powder mixture is refined and the electrolytic copper powder is used, the flowability of the metal powder mixture generally decreases. However, the inventors of the present invention have made extensive investigations, and as a result, it has been clarified that, when the electrolytic copper powder contains particles having high circularity in a predetermined amount or more, the decrease in flowability of the metal powder mixture is suppressed. With this, the metal powder mixture can be smoothly poured into a cavity of a forming die. Therefore, the metal powder mixture can be uniformly filled into the cavity, and the inner pores of the sintered bearing can be uniformly dispersed to prevent the formation of coarse pores.

It is preferred that, as the copper powder, powder containing 15 wt % or more of particles having an average particle diameter of less than 45 μm be used. Thus, when the copper powder contains few coarse particles having an average particle diameter of 45 µm or more, the formation of coarse pores caused by coarse particles can be suppressed, and the size of the surface openings of the sintered bearing can be made uniform.

Further, it is preferred that, as the copper powder, powder containing less than 10 wt % of particles having an average particle diameter of less than 10 µm be used. Thus, when the copper powder contains few ultra-fine particles having an average particle diameter of less than 10 µm, the flowability of the metal powder mixture can be further increased.

As the electrolytic copper powder, for example, powder having an apparent density of from 1.4 g/cm$^3$ to 1.7 g/cm$^3$ may be used.

In the case where the metal powder mixture contains 50 wt % or more of the electrolytic copper powder, there is an increasing risk in that the flowability of the metal powder mixture may decrease. Therefore, it is effective to incorporate particles having high circularity in a predetermined amount or more as described above. Further, when the amount of the electrolytic copper powder to be contained in the metal powder mixture is more than 60 wt %, the ratio of the copper component becomes excessive, and there is a risk in that the strength of the bearing becomes insufficient. In view of the above, it is preferred that the electrolytic copper powder in the metal powder mixture be from 50 wt % to 60 wt %.

It is preferred that, as the iron powder, powder containing 80 wt % or more of particles having an average particle diameter of less than 45 µm be used.

As the iron powder, for example, reduced iron powder may be used.

The sintered bearing comprises a sintered metal containing copper and iron as main components, and specifically, the sintered bearing comprises, for example, a sintered metal containing 38 wt % to 42 wt % of iron and 1 wt % to 3 wt % of tin, with the balance being copper and unavoidable impurities.

Advantageous Effects of Invention

As described above, according to the one embodiment of the present invention, when the fine metal powder mixture is used, and the copper powder contains the electrolytic copper powder, the density of the sintered bearing is increased to reduce the surface openings. Further, when the electrolytic copper powder contains particles having high circularity in a predetermined amount or more, the flowability of the metal powder mixture is increased, and the metal powder mixture can be uniformly filled into the cavity of the forming die. Thus, when fine and uniform inner pores are obtained in the sintered bearing, the bearing stiffness can be increased with the dynamic pressure absence suppressed sufficiently.

BRIEF DESCRIPTION OF DRAWINGS

FIG. 4A is a sectional view for illustrating a state in which metal powder is filled into a cavity in a compression molding step of the bearing sleeve.
FIG. 4B is a sectional view for illustrating a state in which metal powder is compressed in the compression molding step of the bearing sleeve.
FIG. 4C is a sectional view for illustrating a state in which a compact is removed from a die in the compression molding step of the bearing sleeve.

DESCRIPTION OF EMBODIMENTS

Figure 1:
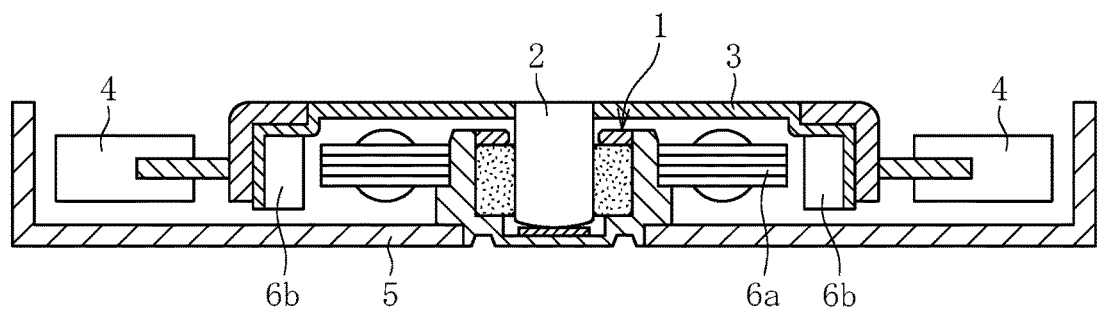
FIG. 1 is a sectional view of a fan motor.

FIG. 1 is an illustration of a fan motor of an information device such as a mobile telephone or a tablet terminal. The fan motor comprises a fluid dynamic bearing device 1 configured to rotatably support a shaft member 2 in a non-contact manner, a rotor 3 mounted on the shaft member 2, a blade 4 mounted on a radially outer end of the rotor 3, a stator coil 6a and a rotor magnet 6b opposed to each other through intermediation of a gap in a radius direction (radial direction), and a casing 5 configured to accommodate the above-mentioned components, in which an upper end surface and a part of a side surface of the casing 5 are opened. The stator coil 6a is mounted on an outer periphery of the fluid dynamic bearing device 1, and the rotor magnet 6b is mounted on an inner periphery of the rotor 3. When an electric current is supplied to the stator coil 6a, the rotor 3, the blade 4, and the shaft member 2 rotate integrally, to thereby generate an air stream in an axial direction or a radially outer direction.

Figure 2:
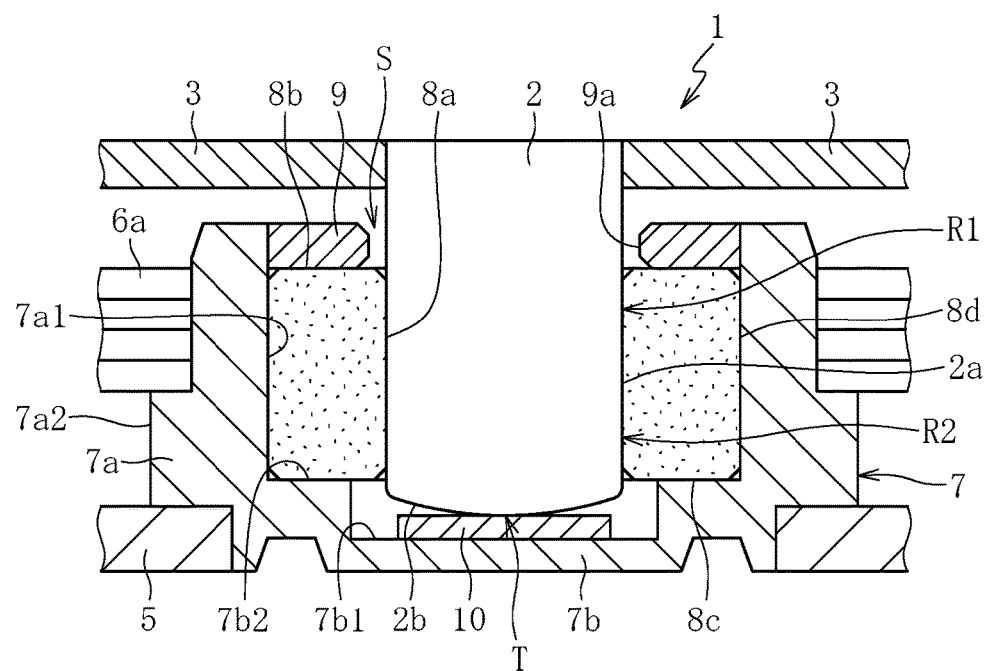
FIG. 2 is a sectional view of a fluid dynamic bearing device to be incorporated into the fan motor.

As illustrated in FIG. 2, the fluid dynamic bearing device 1 comprises the shaft member 2, a housing 7, a bearing sleeve 8 serving as a sintered bearing, a sealing member 9, and a thrust receiver 10. Note that, a bottom portion 7b side of the bottomed tubular housing 7 is hereinafter referred to as a lower side and an opening side thereof is hereinafter referred to as an upper side.

The shaft member 2 is formed of a metal material such as stainless steel into a columnar shape. The shaft member 2 comprises a cylindrical outer peripheral surface 2a and a spherical protruding portion 2b formed at a lower end thereof.

The housing 7 comprises a substantially cylindrical side portion 7a and a bottom portion 7b that closes an opening of the side portion 7a on the lower side. In the illustrated example, the side portion 7a and the bottom portion 7b are integrally formed of a resin through injection molding. The casing 5 and the stator coil 6a are fixed onto an outer peripheral surface 7a2 of the side portion 7a. An outer peripheral surface 8d of the bearing sleeve 8 is fixed onto an inner peripheral surface 7a1 of the side portion 7a. A shoulder surface 7b2 positioned above an inner diameter portion is formed at a radially outer end of an upper end surface 7b1 of the bottom portion 7b. A lower end surface 8c of the bearing sleeve 8 is held in abutment against the shoulder surface 7b2. The thrust receiver 10 is formed in a center portion of the upper end surface 7b1 of the bottom portion 7b.

The bearing sleeve 8 has a cylindrical shape and is fixed onto the inner peripheral surface 7a1 of the side portion 7a of the housing 7 by appropriate means such as bonding with a clearance, press fitting, or press-fit bonding. The inner diameter of the bearing sleeve 8 is set to from about 0.6 mm to about 2.0 mm, and the outer diameter thereof is set to from about 1.5 mm to about 4.0 mm. The bearing sleeve 8 comprises a sintered metal containing copper and iron as main components. The bearing sleeve 8 according to this embodiment comprises a sintered metal containing 38 wt % to 42 wt % of iron and 1 wt % to 3 wt % of tin, with the balance being copper and unavoidable impurities. The density of the bearing sleeve 8 is set to from 6.9 g/cm$^3$ to 7.3 g/cm$^3$ in a dried state (state in which the inner pores are not impregnated with oil).

The bearing sleeve 8 has an infinite number of fine inner pores that are uniformly dispersed. The oil permeability of the bearing sleeve 8 is set to less than 0.02 g/10 min, preferably less than 0.015 g/10 min. Further, the oil permeability of the bearing sleeve 8 is set to 0.005 g/10 min or more. Note that, the term "oil permeability" as used herein refers to the permeation amount of oil when both the end surfaces 8b and 8c of the bearing sleeve 8 are entirely sealed, and the oil is pumped from an inner diameter to an outer diameter of the bearing sleeve 8 at 0.4 MPa for 10 minutes. As the oil in this case, oil having a viscosity of 45 mm$^2$/s at 40° C. is used.

Figure 3:
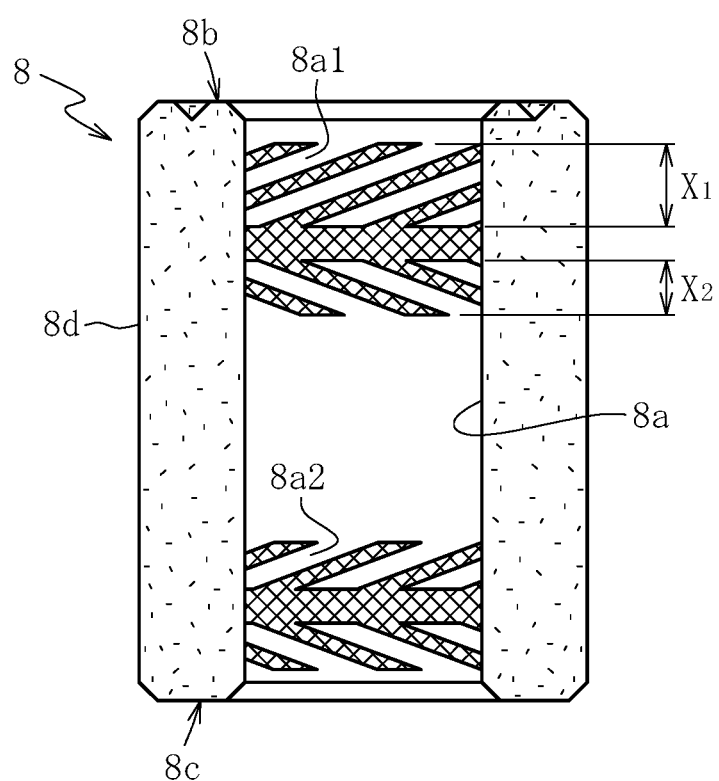
FIG. 3 is a sectional view of a bearing sleeve (sintered bearing) to be incorporated into the fluid dynamic bearing device.

A dynamic pressure generating groove serving as a radial dynamic pressure generating part is formed in the inner peripheral surface 8a of the bearing sleeve 8 serving as a radial bearing surface. In this embodiment, for example, as illustrated in FIG. 3, dynamic pressure generating grooves 8a1 and 8a2 each having a herringbone shape are formed in two portions of the inner peripheral surface 8a, which are separated from each other in the axial direction. The dynamic pressure generating grooves 8a1 and 8a2 are formed between hill portions indicated by the cross-hatching in FIG. 3. The dynamic pressure generating grooves 8a1 on the upper side are formed asymmetrically in the axial direction with respect to an annular portion formed in a substantially center portion of the hill portion in the axial direction, and an axial dimension X1 of a region on an upper side from the annular portion is set to be larger than an axial dimension X2 of a region on a lower side from the annular portion (X1>X2). With this, a lubricating oil in a radial bearing gap is pushed downward to forcibly circulate a lubricating oil inside the bearing, to thereby keep a pressure balance inside the bearing properly. Meanwhile, the dynamic pressure generating grooves 8a2 on the lower side are formed symmetrically in the axial direction.

The sealing member 9 is formed of a resin or a metal into an annular shape, and is fixed onto an upper end portion of the inner peripheral surface 7a1 of the side portion 7a of the housing 7. The sealing member 9 is held in abutment against the upper end surface 8b of the bearing sleeve 8. An inner peripheral surface 9a of the sealing member 9 is opposed to the outer peripheral surface 2a of the shaft member 2 in the radius direction, and a sealing space S is formed therebetween. At time of rotation of the shaft member 2, the lubricating oil inside the bearing is prevented from leaking outside due to the sealing space S.

The fluid dynamic bearing device 1 is assembled through the following procedure. First, the thrust receiver 10 is arranged on the upper end surface 7b1 of the bottom portion 7b of the housing 7. Then, the bearing sleeve 8, in which inner pores are impregnated with a lubricating oil in advance, is inserted into an inner periphery of the side portion 7a of the housing 7, and the lower end surface 8c of the bearing sleeve 8 is brought into abutment against the shoulder surface 7b2 of the bottom portion 7b. In this state, the outer peripheral surface 8d of the bearing sleeve 8 is fixed onto the inner peripheral surface 7a1 of the side portion 7a. After that, the sealing member 9 is fixed onto an upper end of the inner peripheral surface 7a1 of the side portion 7a of the housing 7. In this case, the bearing sleeve 8 can be retained in the axial direction by press-fitting the sealing member 9 into the side portion 7a of the housing 7 and holding the bearing sleeve 8 with the sealing member 9 and the shoulder surface 7b2 of the bottom portion 7b of the housing 7 from both sides in the axial direction. Then, a lubricating oil is dropped onto an inner periphery of the bearing sleeve 8 and the shaft member 2 is inserted therein, to thereby complete the assembly of the fluid dynamic bearing device 1. In this case, the lubricating oil is filled into an inner space of the housing 7 (including inner pores of the bearing sleeve 8), which is sealed with the sealing member 9, and an oil surface is maintained within a range of the sealing space S.

In the fluid dynamic bearing device 1 having the above-mentioned configuration, when the shaft member 2 rotates, the radial bearing gap is formed between the inner peripheral surface 8a of the bearing sleeve 8 and the outer peripheral surface 2a of the shaft member 2. Then, the dynamic pressure generating grooves 8a1 and 8a2 formed in the inner peripheral surface 8a of the bearing sleeve 8 generate a dynamic pressure action in the lubricating oil in the radial bearing gap, to thereby form a first radial bearing part R1 and a second radial bearing part R2 for supporting the shaft member 2 in the radial direction. Further, the protruding portion 2b formed at the lower end of the shaft member 2 and the thrust receiver 10 slide on each other in a contact manner, to thereby form a thrust bearing part T for supporting the shaft member 2 in a thrust direction.

In this case, as described above, the oil permeability of the bearing sleeve 8 is set to less than 0.02 g/10 min, and hence the dynamic pressure absence from the radial bearing surface can be suppressed, and the bearing stiffness in the radial direction can be increased. In particular, in the case of the fluid dynamic bearing device 1 to be incorporated into a mobile telephone or a tablet terminal as in this embodiment, loads in various directions are applied to the shaft member 2, and hence it is preferred that the oil permeability be decreased to increase the bearing stiffness as described above. Further, the oil permeability of the bearing sleeve 8 is set to 0.005 g/10 min or more, and hence oil can be distributed to some degree through the inner pores of the bearing sleeve 8, thereby being capable of preventing the local degradation of oil and the occurrence of a negative pressure.

Now, a method of manufacturing the bearing sleeve 8 is described. The bearing sleeve 8 is manufactured through a mixing step, a compression molding (forming) step, a sintering step, and a dynamic pressure generating groove sizing step.

In the mixing step, copper powder, iron powder, tin powder, and graphite described below are mixed in a predetermined ratio to prepare a metal powder mixture serving as a material for the bearing sleeve 8.

The copper powder contains electrolytic copper powder. In this embodiment, the electrolytic copper powder is incorporated in an amount of 50 wt % or more with respect to the entire metal powder mixture. Further, in this embodiment, the entire copper powder is the electrolytic copper powder. The copper powder contains 85 wt % to 95 wt % of particles having an average particle diameter of less than 45 μm. Further, the copper powder contains less than 10 wt % of particles having an average particle diameter of less than 10 μm. The copper powder contains 40 number % to 50 number % of particles having a circularity of 0.64 or more. The apparent density of the copper powder is set to from 1.4 g/cm$^3$ to 1.7 g/cm$^3$.

As the iron powder, for example, reduced iron powder is used. The iron powder contains 80 wt % to 90 wt % of particles having an average particle diameter of less than 45 μm. The iron powder contains less than 10 wt % of particles having an average particle diameter of less than 10 μm. The average particle diameter of the entire iron powder is slightly larger than the average particle diameter of the entire copper powder.

As the tin powder, for example, atomized powder is used. The tin powder contains 98 wt % or more of particles having an average particle diameter of less than 45 μm. The tin powder contains less than 10 wt % of particles having an average particle diameter of less than 10 μm.

The copper powder, the iron powder, and the tin powder are mixed in a predetermined ratio to prepare a metal powder mixture. The metal powder mixture has a composition of from 38 wt % to 42 wt % of the iron powder and from 1 wt % to 3 wt % of the tin powder, with the balance being copper and unavoidable impurities. Note that, in order to improve the moldability at time of the compression molding or sliding characteristics of a finished product, a solid lubricant such as graphite may be blended with the metal powder mixture M. The metal powder mixture M contains 80 wt % or more of particles having an average particle diameter of less than 45 μm. Further, the metal powder mixture M contains less than 10 wt % of particles having an average particle diameter of less than 10 μm. Thus, when the metal powder mixture M is formed of fine particles, the apparent density is decreased, and there is a risk in that the flowability of the metal powder mixture M may decrease. However, when the electrolytic copper powder in the metal powder mixture contains 40 number % or more of particles having a circularity of 0.64 or more as described above, the decrease in apparent density of the metal powder mixture M is suppressed (specifically, from 2.0 $g/cm^3$ to 2.3 $g/cm^3$), and the decrease in flowability of the metal powder mixture M can be suppressed (specifically, a fluidity of from 80 sec/50 g to 90 sec/50 g). Note that, the fluidity is measured by "Metal powder-fluidity measurement method" of JIS Z2502: 2012.

In the compression molding step, the metal powder mixture M mixed in the mixing step is subjected to compression molding in a predetermined shape (cylindrical shape in the illustrated example) to form a compact. Specifically, first, as illustrated in FIG. 4A, the metal powder mixture M is poured into a cavity defined by an inner peripheral surface 11a of a die 11 of a forming die, an outer peripheral surface 12a of a core rod 12, and an upper end surface 13a of a lower punch 13. In this case, the fluidity of the metal powder mixture M is suppressed to 90 sec/50 g or less. Therefore, the metal powder mixture M is smoothly poured into the cavity, and the metal powder mixture M can be uniformly filled into the entire cavity.

Then, an upper punch 14 is lowered to compress the metal powder M from above, to thereby mold a cylindrical compact Ma (see FIG. 4B). Then, the die 11 is moved relatively downward with respect to the compact Ma, to thereby release the compact Ma from the die (see FIG. 4C). In this case, as the metal powder mixture M, fine powder containing 80 wt % or more of particles having an average particle diameter of less than 45 μm is used, and hence the density of the compact Ma can be increased to obtain fine inner pores. Further, as described above, the metal powder mixture M is uniformly filled into the entire cavity, and hence the inner pores of the compact Ma can be uniformly dispersed.

In the sintering step, the compact Ma is sintered at a predetermined sintering temperature to form a sintered body. The temperature at time of the sintering (sintering temperature) is set to less than the melting point (1,085° C.) of copper, for example, from 850° C. to 900° C., and the temperature is set to 870° C. in this embodiment. In this case, the metal powder mixture M contains the electrolytic copper powder, and hence the sintering of the copper powder is accelerated, and further finer inner pores are obtained in the sintered body.

In the dynamic pressure generating groove sizing step, the radial dynamic pressure generating parts (dynamic pressure generating grooves 8a1 and 8a2) illustrated in FIG. 3 are formed on an inner peripheral surface of the sintered body. Specifically, although not shown, the core rod is inserted into an inner periphery of the sintered body, and both end surfaces of the sintered body in the axial direction are retained with the upper and lower punches. In this state, the sintered body and the core rod are press-fitted into an inner periphery of the die, and thus, the inner peripheral surface of the sintered body is pressed against a mold formed on the outer peripheral surface of the core rod. With this, the shape of the mold is transferred onto the inner peripheral surface of the sintered body, to thereby form the dynamic pressure generating grooves 8a1 and 8a2. After that, the sintered body and the core rod are pulled out from the inner periphery of the die to cause the sintered body to spring back in the radially outer direction, and the inner peripheral surface of the sintered body is released from the outer peripheral surface of the core rod. Then, the core rod is pulled out from the inner periphery of the sintered body, to thereby complete the bearing sleeve 8.

As described above, when the particles of the metal powder mixture are refined, and the electrolytic copper powder is used, the fine and uniform inner pores are obtained in the bearing sleeve 8, with the result that the oil permeability of the bearing sleeve 8 is set to less than 0.02 g/10 min. With this, the bearing stiffness can be increased with the dynamic pressure absence from the bearing surface (in particular, the radial bearing surface) suppressed without subjecting the bearing surface to pore-sealing treatment. Note that, the pore-sealing treatment is not necessarily required to be omitted. If there are no problems in terms of manufacturing efficiency and cost, the inner peripheral surface of the sintered body before being subjected to dynamic pressure generating groove sizing may be subjected to pore-sealing treatment such as rotation sizing or shot blasting. In this case, the surface openings of the bearing surface can be further reduced, and the bearing stiffness can be further increased.

Example 1

In order to confirm the effects of the present invention, the following test was conducted. First, an implementation product and a comparative product each having compositions shown in Table 1 were formed. The implementation product and the comparative product each have a cylindrical shape having an inner diameter of 1.5 mm, an outer diameter of 3.0 mm, and an axial dimension of 3.0 mm.

TABLE 1

| | | Implementation product | Comparative product |
|---|---|---|---|
| Copper (wt %) | Copper powder A (electrolytic powder) | 57.8 | |
| | Copper powder B (electrolytic powder) | | 40.5 |
| | Copper powder C (atomized powder) | | 17.3 |

TABLE 1-continued

|  |  | Implementation product | Comparative product |
|---|---|---|---|
| Iron (wt %) | Iron powder A (reduced powder) | 39.9 | 13.3 |
|  | Iron powder B (atomized powder) |  | 26.6 |
| Tin (wt %) | Tin powder A (atomized powder) | 1.5 |  |
|  | Tin powder B (atomized powder) |  | 1.5 |
| Others |  | 0.8 | 0.8 |

Table 2 shows a particle size distribution and a circularity distribution of the copper powder A (electrolytic powder) and the copper powder B (electrolytic powder) in Table 1.

TABLE 2

|  |  | Copper powder A | Copper powder B |
|---|---|---|---|
| Apparent density (g/cm$^3$) |  | 1.40-1.70 | 1.35-1.55 |
| Particle size distribution (vol %) | +75 µm |  | 5.0 or less |
|  | +63 µm | 2.0 or less | 5.0-15.0 |
|  | +45 µm | 5.0-15.0 | 20.0-35.0 |
|  | −45 µm | 85.0-95.0 | 55.0-75.0 |
| Circularity (number %) | +0.84 | 7.48 | 5.54 |
|  | +0.64 | 46.41 | 34.50 |
|  | +0.44 | 86.17 | 80.88 |
|  | +0.24 | 99.70 | 99.75 |

As shown in Table 2, the electrolytic copper powder A contained in the implementation product contains 85 wt % or more of particles having an average particle diameter of less than 45 µm, and the electrolytic copper powder B contained in the comparative product contains 55% to 75% of particles having an average particle diameter of less than 45 µm. That is, the electrolytic copper powder A contains a larger amount of fine particles than the electrolytic copper powder B. Further, the electrolytic copper powder A contains about 46 number % of particles having a circularity of 0.64 or more, whereas the electrolytic copper powder B contains about 35 number % of particles having a circularity of 0.64 or more. That is, the electrolytic copper powder A contains a larger amount of particles close to a circular shape than the electrolytic copper powder B. In general, it is considered that the electrolytic copper powder A containing a larger amount of fine particles has an apparent density lower than that of the electrolytic copper powder B. However, in this embodiment, the apparent density of the electrolytic copper powder A is higher than that of the electrolytic copper powder B. The reason for this is considered as follows: the electrolytic copper powder A contains particles having high circularity in a larger amount.

Table 3 shows a particle size distribution of the iron powder A (reduced powder) and the iron powder B (atomized powder) in Table 1.

TABLE 3

| Iron powder A | | |
|---|---|---|
| Particle size distribution (vol %) | +150 µm | 0 |
|  | 75-150 µm | 0 |
|  | 45-75 µm | 15.2 |
|  | 38-45 µm | 21.2 |
|  | −38 µm | 63.6 |

TABLE 3-continued

| Iron powder B | | |
|---|---|---|
| Particle size distribution (vol %) | 150-212 µm | 1.6 |
|  | 106-150 µm | 27.2 |
|  | 75-106 µm | 31.1 |
|  | 45-75 µm | 24.3 |
|  | −45 µm | 16.6 |

As shown in Table 3, the iron powder A contained in the implementation product contains about 85 wt % of particles having an average particle diameter of less than 45 µm, and the iron powder B contained in the comparative product contains about 17% of particles having an average particle diameter of less than 45 µm. That is, the iron powder A contains a larger amount of fine particles than the iron powder B.

Table 4 shows a particle size distribution of the tin powder A (atomized powder) and the tin powder B (atomized powder) in Table 1.

TABLE 4

|  |  | Tin powder A | Tin powder B |
|---|---|---|---|
| Apparent density (g/cm$^3$) |  | 1.10-1.90 | 1.80-2.50 |
| Particle size distribution (vol %) | +63 µm |  | 1.0 or less |
|  | +45 µm | 2.0 or less | 5.0 or less |
|  | −45 µm | 98.0 or more | 94.0 or more |

As shown in Table 4, both the tin powder A and the tin powder B are fine powders containing 90% or more of particles having an average particle diameter of less than 45 µm. However, the tin powder A contains a larger amount of fine particles than the tin powder B.

Metal powder mixtures serving as materials for the implementation product and the comparative product were measured for apparent density and fluidity. Further, sintered bodies (implementation product and comparative product) formed by using those metal powder mixtures were measured for oil permeability. The results are shown in Table 5.

TABLE 5

|  | Implementation product | Comparative product |
|---|---|---|
| Oil permeability (g/10 min) | 0.0103 | 0.0246 |
| Apparent density (g/cm$^3$) | 2.22 | 2.37 |
| Fluidity (sec/50 g) | 85.2 | 72.7 |

As shown in Table 5, the oil permeability of the implementation product is lower than that of the comparative product. The reason for this is considered as follows: the material powder is refined, and hence fine inner pores are obtained in the implementation product, and thus fine surface openings are obtained in the bearing surface. Meanwhile, as shown in Table 1 to Table 4, the ratio of fine particles is higher in any of the copper powder, the iron powder, and the tin powder of the implementation product than in any of the copper powder, the iron powder, and the tin powder of the comparative product. In this case, it is considered that the apparent density of the material powder of the implementation product becomes significantly lower than that of the material powder of the comparative product. However, in this embodiment, as shown in Table 2, the copper powder of the implementation product contains a large amount of particles close to a circular shape, and hence the apparent density becomes high in spite of the fact that the ratio of fine particles in the copper powder of the implementation product is higher than that in the copper powder of the comparative product. With this, the fluidity of the material powder of the implementation product is suppressed to a degree slightly higher than that of the comparative product and is suppressed to a degree (for example, 90 sec/50 g or less) required for molding a sintered bearing of a size of the above-mentioned embodiment. As described above, it was confirmed that, in the implementation product of the present invention, the oil permeability was able to be decreased (the effect of suppressing the dynamic pressure absence was increased) through use of powder that was finer than that of the comparative product, and the decrease in flowability of the material powder was suppressed (the material powder was able to be uniformly filled into the cavity) by incorporating a larger amount of particles close to a circular shape into the copper powder.

REFERENCE SIGNS LIST 1 fluid dynamic bearing device
2 shaft member
7 housing
8 bearing sleeve (sintered bearing)
9 sealing member
R1, R2 radial bearing part
T thrust bearing part
S sealing space

The invention claimed is:

1. A sintered bearing, comprising a sintered metal formed by using a metal powder mixture containing copper powder and iron powder,
the metal powder mixture containing 80 wt % or more of particles having an average particle diameter of less than 45 μm,
the copper powder containing electrolytic copper powder containing 40 number % or more of particles having a circularity of 0.64 or more.

2. The sintered bearing according to claim 1, wherein the copper powder contains 85 wt % or more of particles having an average particle diameter of less than 45 μm.

3. The sintered bearing according to claim 1, wherein the copper powder contains less than 10 wt % of particles having an average particle diameter of less than 10 μm.

4. The sintered bearing according to claim 1, wherein the electrolytic copper powder has an apparent density of from 1.4 g/cm$^3$ to 1.7 g/cm$^3$.

5. The sintered bearing according to claim 1, wherein the metal powder mixture contains 50 wt % to 60 wt % of the electrolytic copper powder.

6. The sintered bearing according to claim 1, wherein the iron powder contains 80 wt % or more of particles having an average particle diameter of less than 45 μm.

7. The sintered bearing according to claim 1, wherein the iron powder comprises reduced iron powder.

8. The sintered bearing according to claim 1, comprising a sintered metal containing 38 wt % to 42 wt % of iron and 1 wt % to 3 wt % of tin, with the balance being copper and unavoidable impurities.

9. A fluid dynamic bearing device, comprising:
the sintered bearing of claim 1;
a shaft member inserted into an inner periphery of the sintered bearing; and
a lubricating oil filled into a radial bearing gap formed between an inner peripheral surface of the sintered bearing and an outer peripheral surface of the shaft member.

10. A motor, comprising:
the fluid dynamic bearing device of claim 9;
a stator coil; and
a rotor magnet.

11. A method of manufacturing a sintered bearing, comprising:
subjecting a metal powder mixture containing copper powder and iron powder to compression molding to form a compact; and
sintering the compact at a predetermined sintering temperature,
the metal powder mixture containing 80 wt % or more of particles having an average particle diameter of less than 45 μm,
the copper powder containing electrolytic copper powder containing 40 number % or more of particles having a circularity of 0.64 or more.

12. The method of manufacturing the sintered bearing according to claim 11, wherein the copper powder contains 85 wt % or more of particles having an average particle diameter of less than 45 μm.

13. The method of manufacturing the sintered bearing according to claim 11, wherein the copper powder contains less than 10 wt % of particles having an average particle diameter of less than 10 μm.

14. The method of manufacturing the sintered bearing according to claim 11, wherein the electrolytic copper powder has an apparent density of from 1.4 g/cm$^3$ to 1.7 g/cm$^3$.

15. The method of manufacturing the sintered bearing according to claim 11, wherein the metal powder mixture contains 50 wt % to 60 wt % of the electrolytic copper powder.

16. The method of manufacturing the sintered bearing according to claim 11, wherein the iron powder contains 80 wt % or more of particles having an average particle diameter of less than 45 μm.

17. The method of manufacturing the sintered bearing according to claim 11, wherein the iron powder comprises reduced iron powder.

18. The method of manufacturing the sintered bearing according to claim 11, comprising a sintered metal containing 38 wt % to 42 wt % of iron and 1 wt % to 3 wt % of tin, with the balance being copper and unavoidable impurities.

* * * * *